July 21, 1931.  L. KELLY  1,815,259
FUEL CONTROL DEVICE FOR GASOLINE AND OIL ENGINES
Filed Jan. 3, 1928  2 Sheets-Sheet 1

WITNESSES:
Gerhard Banle
Evelyn Crampton

INVENTOR
Leland Kelly,
BY
Joshua R. H. Toth
ATTORNEY

July 21, 1931. L. KELLY 1,815,259

FUEL CONTROL DEVICE FOR GASOLINE AND OIL ENGINES

Filed Jan. 3, 1928  2 Sheets-Sheet 2

WITNESSES:
Gerhard Banks
Evelyn Crompton

INVENTOR
Leland Kelly,
BY
Joshua N. F. Hoth
ATTORNEY

Patented July 21, 1931

1,815,259

UNITED STATES PATENT OFFICE

LELAND KELLY, OF PORT REPUBLIC, NEW JERSEY

FUEL CONTROL DEVICE FOR GASOLINE AND OIL ENGINES

Application filed January 3, 1928. Serial No. 244,171.

This invention relates to gasoline and oil engines and more particularly to means for substantially automatically controlling their shaft speed of rotation.

The object of the invention is to provide a device adapted to adjust the supply of fuel to an engine whereby the revolutions per minute may be held at a substantially uniform and predetermined rate regardless of the load, provided it is within the capacity of the engine.

Another object is to enable the operation of an engine with the throttle in one set position, the load determining the gas consumption and rate of consumption.

A feature of the invention resides in the provision of an automatically adjustable shutter between the fuel supply and the division of the intake manifold of an engine, controlled by the suction of the pistons, to vary the feed as the number of revolutions per minute tends to increase or decrease.

Another feature comprises means for adjustably controlling the action of the shutter whereby its movement will assure the regulation of the engine speed and maintain it substantially at a desired rate, notwithstanding that its movement will not necessarily be directly proportionate to the variations in load or other factor affecting the speed of the engine.

Other objects and features, particularly those having for their purpose the control of the shutter and the regulation of its movement as the load changes, will be apparent from the following description to be read in conjunction with the accompanying drawings in which:—

Considering all the figures simultaneously, similar designations referring to similar parts, numeral 9 designates a gas engine having a carburetor 10 and an intake manifold 11. Fuel control device 12 is removably positioned between the carburetor and manifold.

Figure 1:
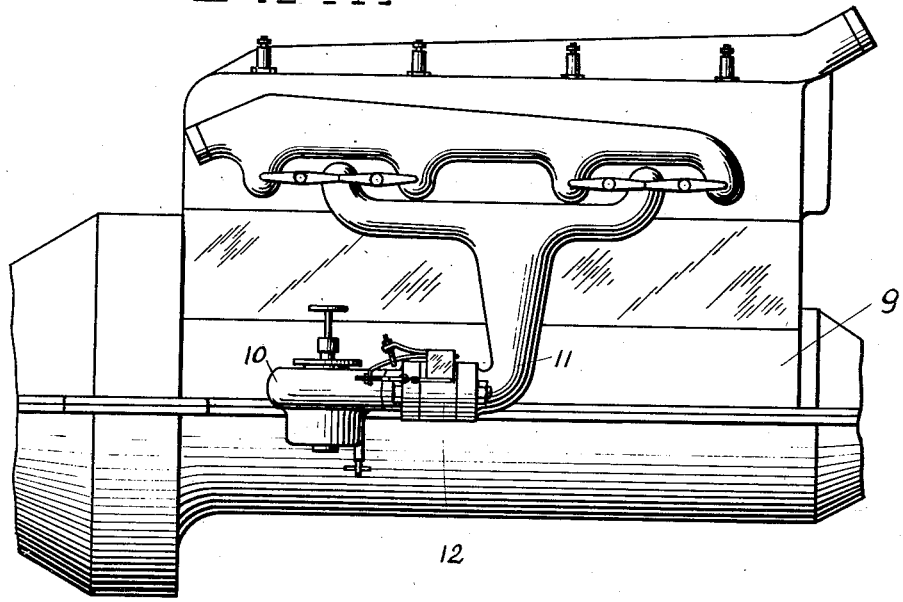
Figure 1 illustrates a gas engine in which the invention is incorporated. The device is shown positioned between the carburetor and intake manifold.
Figure 2:
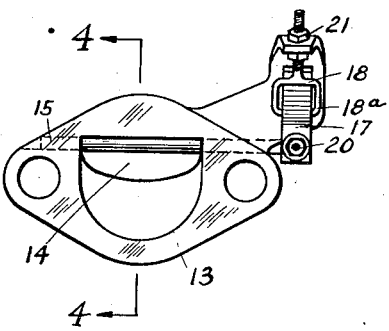
Figure 2 is a view of one form of the device, looking at the face adapted to be fitted adjacent the carburetor.
Figure 3:
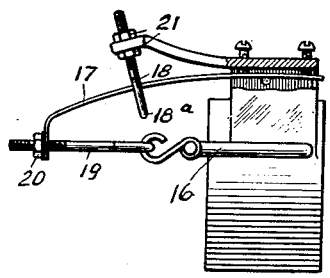
Figure 3 is a side view of the device of Figure 2 and illustrates one type of adjusting mechanism adapted to control the shutter.
Figure 4:
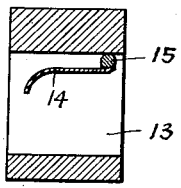
Figure 4 is a section on lines 4—4 of Figure 2 and shows the shutter within the device formed to readily respond to suction of the engine.

The form of device shown in Figures 2, 3 and 4 has a passage 13 in which is positioned shutter 14 mounted on arm 15.

The arm is swingable in the body of the device and has an extension 16. As the shutter 14 moves up and down to control the opening in passage 13, extension arm 16 will similarly move up and down against the tension of spring 17. The spring is suitably mounted on the body of the device, as shown, and is positioned through a loop 18ª in tension element 18. The other end has an opening therein and is mounted over threaded arm 19. By means of nut 20 on the threaded arm, the tension of spring 17 may be varied and by means of nut 21 the distance of the spring above the bottom of element 18 may be adjusted. The shutter 14 has its bottom portion in the form of a projecting lip, as is more clearly illustrated in Figure 4. Due to this construction, the shutter more readily responds to the suction of the engine.

In the operation of the device, nuts 20 and 21 are adjusted depending upon the revolutions per minute at which it is desired to operate the engine. The throttle may be set in wide open position; or in the case of some types of tractors, tanks, etc., no throttle need be provided. When the engine is started, the tendency will be for the engine to race inasmuch as the passage is wide open and the full fuel supply is available for consumption. However, immediately the engine commences to turn over at a greater number of revolutions than that for which the device is set, the suction in the manifold will be sufficient to pull shutter 14 toward closing position. Arm 16 will first move against the tension of spring 17 alone, determined by the position of nut 20. As the arm moves down, it is patent that the tension of the spring will increase. When, however, the spring is pulled down so that it contacts with the bottom part of loop 18ª the tension will be disproportionately increased and will grow at a greater rate as shutter 14 seeks to reach the closed position. The shutter is formed so that if the spring gives way or the adjustments are loosened, the shutter will assume a position wherein the fuel passing between its lowermost portion and the bottom of the passage will be sufficient to enable the engine to idle.

The adjustments are changed, as desired, and may be set to control the speed to any predetermined number of revolutions per minute. If the load is increased the shutter will allow a greater amount of fuel to reach the engine to maintain its speed of rotation, the suction being decreased sufficiently to enable the adjustment device to allow the shutter to assume its new position. If the load is lightened the suction will naturally become greater and the shutter assume a position in which the passage is lessened in area. The fuel is thus controlled in accordance with the load in order to maintain a predetermined speed.

Figure 5:
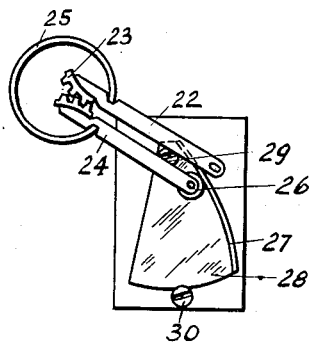
Figure 5 illustrates another adjustable tensioning device for controlling the shutter and shows a novel form of regulating the tension as the speed of the engine varies.

Figure 5 shows another form of adjustment means for the shutter. Arm 22 moves up and down with the shutter and has one end integral with the shaft on which the shutter is mounted. The other end is provided with tooth gear 23 which meshes with corresponding teeth on arm 24. Spring 25 tends to keep arms 22 and 24 together. Roller 26 on arm 24 moves against element 27 forming a channel with adjustable plate 28. The plate is swingable above pivot 29 and is fixed in position by set screw 30. As the shutter moves down from open position, arm 22 will move downwardly also and through gears 23 move arm 24 against the tension of spring 25. In order to increase the tension of the spring as roller 26 moves downwardly against element 27, the gears 23 are provided so that the center from which arms 22 and 24 move is shifted, as the spring is moved apart responsive to the movement of the arms. By shifting the plate, element 27 may be variously positioned and the resistance offered to roller 26 be increased or lessened, depending upon the speed at which it is desired to run the engine under various conditions. If the plate is moved to the left, in the illustration of Figure 5, the resistance of the roller against element 27 will be increased, whereas if plate 28 is shifted to the right, the resistance offered to the roller will be decreased. It is of note that the resistance of element 27 to the roller will be disproportionately increased as the roller moves downwardly. It is found that by different designs of plate 28 and element 27, the speed of an engine may be adjusted to such a nicety that the revolutions for shifting loads may be controlled within a very limited range.

Figure 6:
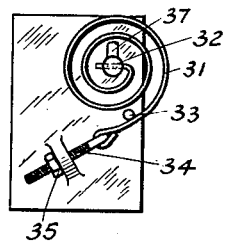
Figure 6 shows a similar device using a spiral spring as the medium for applying variable tension to the shutter.

In Figure 6 is illustrated spiral spring 31; one end of which is fixed in arm 32. The arm is directly controlled by and moves with the shutter. The other end of the spring is positioned about stop 33 and may be adjustably tensioned by screw holder 34. As illustrated, the screw may be adjusted by nut 35 to vary the tension of the spring. Projection 36 is provided on arm 32. The projection does not contact with the spring when the shutter is in open position. When the shutter moves downwardly however, arm 32 will begin to rotate against the tension of the spiral. When the shutter reaches a predetermined position, projection 36 will then make contact with the spring and the tension will be disproportionately decreased from there on. By different sized projections variously positioned from the spiral and by the adjustment of the screw holder 34, the position of the shutter will be controlled at various loads to feed the required amount of fuel to maintain a substantially constant speed.

Figure 7:
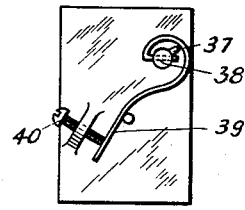
Figure 7 illustrates a leaf spring adapted to accomplish the same purpose.

In Figure 7 the same principle is employed, projection 37 being provided on arm 38 which is directly controlled by the shutter. The other extremity 39 of the spring has set screw 40 abutting it. The tension of the spring is varied by the pressure of screw 40 against it. As the shutter moves downwardly, the space between the projection 37 and the spring will decrease and after the shutter reaches a predetermined position the spring will make contact with the projection and the tension will increase disproportionately from then on to control the shutter at the greater speed.

Figure 8:
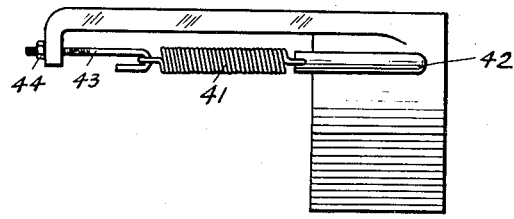
Figure 8 represents another arrangement wherein a coil spring in combination with an adjustable arm is designed to regulate the movement of the shutter.

In Figure 8 a very simple form is illustrated in which coiled spring 41 is attached at one end to arm 42 controlled by the shutter and at the other end to an adjustable holder 43. The tension of the spring is initially adjusted by nut 44 and will disproportionately increase as it projects from the horizontal to the vertical, responsive to the movement of arm 42. This device is of value where a simple expedient is desired in heavy duty truck work, and like operating units, where a throttle is of advantage under some conditions. The device will act not only as a fuel control but also as a speed governor as the throttle is advanced beyond a certain point.

While I have shown various devices for carrying out the object of this invention, it will be understood that the forms described are merely illustrative and not restrictive. It is obvious that any number of equivalents may be used to accomplish the same purposes without departing from the fundamental principles involved. The scope of the invention should, therefore, be determined not by the mechanical expedients employed to carry out the objects, but rather by the terms of the appended claims, fairly construed in the light of the disclosure.

I claim:—

1. In a speed control device for gasoline engines, a body having a passage therethrough, said device being adapted to be positioned between a carburetor and a division of the intake manifold with the passage connecting the two, a shutter in the passage, a spring linked to the shutter for controlling the movement thereof, and a looped member embracing the spring and adapted to bear thereagainst when the spring has been deformed to a certain extent.

2. A speed control for gasoline engines comprising a body having a passage therethrough, said body being adapted to be positioned between a carburetor and a part of the intake manifold with the passage communicating with both, a shutter in the passage, a spring adjustably connected with the shutter and tending to increase in tension progressively from preelected initial tension as the shutter moves toward closed position and an auxiliary tension means effective at a preadjusted point in the progression.

3. A speed control for gasoline engines comprising a body having a passage therethrough, said body being adapted to be positioned between a carburetor and a part of the intake manifold with the passage communicating with both, a shutter in the passage, a leaf spring adjustably connected with the shutter and tending to increase in tension progressively as the shutter moves toward closed position and an auxiliary means active on said spring at a predetermined point to increase its regular tensional progression.

4. A speed control for gasoline engines comprising a body having a passage therethrough, said body being adapted to be positioned between a carburetor and a part of the intake manifold with the passage communicating with both, a shutter in the passage, a spring connected with the shutter and tending to increase in tension progressively as the shutter moves toward closed position, and means to increase the tension of said spring supplementary to the regular progressive increase.

5. A speed control for gasoline engines comprising a body having a passage therethrough, said body being adapted to be positioned between a carburetor and a part of the intake manifold with the passage communicating with both, a shutter in the passage, a spring connected with the shutter and tending to increase in tension progressively as the shutter moves toward closed position, and auxiliary means to increase the tension of said spring supplementary to the regular progressive increase, said auxiliary means being applicable at variably adjusted tensional stages.

6. A speed control for gasoline engines comprising a body having a passage therethrough, said body being adapted to be positioned between a carburetor and a part of the intake manifold with the passage communicating with both, a shutter in the passage, a spring connected with the shutter and tending to increase in tension progressively as the shutter moves toward closed position, and variable means to increase the tension of said spring supplementary to the progressive increase and at a variably pre-determined stage of the progression.

7. A speed control for gasoline engines comprising a body having a passage therethrough, said body being adapted to be positioned between a carburetor and a part of the intake manifold with the passage communicating with both, a shutter in the passage, a leaf spring connected with the shutter and tending to increase in tension progressively as the shutter moves toward closed position, and means to support said spring intermediate its ends to increase the tension supplementary to the progressive increase, said support being applicable, at an elective pre-determined stage of the progression.

8. A speed control for gasoline engines comprising a body having a passage therethrough, said body being adapted to be positioned between a carburetor and a part of the intake manifold with the passage communicating with both, a shutter in the passage, a leaf spring adjustably connected with the shutter and tending to increase in tension progressively as the shutter moves toward closed position and means to increase the tension of the spring supplementary to the progressive increase and at an elective pre-determined stage of the progression.

In testimony whereof I have signed my name to this specification.

LELAND KELLY.